United States Patent
Konosu

(10) Patent No.: US 10,942,810 B2
(45) Date of Patent: Mar. 9, 2021

(54) START-UP PROCESSING FOR INFORMATION PROCESSING APPARATUS AND METHOD, AND STORAGE MEDIUM

(71) Applicant: CANON KABUSHIKI KAISHA, Tokyo (JP)

(72) Inventor: Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 16/115,796

(22) Filed: Aug. 29, 2018

(65) Prior Publication Data

US 2019/0079829 A1    Mar. 14, 2019

(30) Foreign Application Priority Data

Sep. 11, 2017    (JP) .............................. JP2017-174314

(51) Int. Cl.
| | |
|---|---|
| *G06F 11/14* | (2006.01) |
| *G06F 8/654* | (2018.01) |
| *G06F 3/12* | (2006.01) |
| *G06F 9/4401* | (2018.01) |

(52) U.S. Cl.
CPC .......... *G06F 11/1433* (2013.01); *G06F 3/121* (2013.01); *G06F 3/123* (2013.01); *G06F 8/654* (2018.02); *G06F 9/4401* (2013.01); *G06F 2201/805* (2013.01)

(58) Field of Classification Search
CPC ...... G06F 11/1433; G06F 8/654; G06F 3/121; G06F 3/123; G06F 9/4401
See application file for complete search history.

(56) References Cited

U.S. PATENT DOCUMENTS

| | | | | | |
|---|---|---|---|---|---|
| 5,860,122 | A | * | 1/1999 | Owada | ................ G06F 11/1417 711/162 |
| 6,836,657 | B2 | * | 12/2004 | Ji | ........................ G06F 11/1433 455/419 |
| 8,705,082 | B2 | * | 4/2014 | Nakamoto | ......... H04N 1/32609 358/1.15 |
| 8,788,746 | B2 | * | 7/2014 | Matsushima | .......... G03G 15/50 707/639 |
| 9,317,275 | B2 | * | 4/2016 | Lee | ........................ G06F 9/445 |
| 9,317,281 | B2 | * | 4/2016 | Niwa | ........................ G06F 8/65 |
| 9,367,333 | B2 | * | 6/2016 | Wen | ........................ G06F 9/441 |
| 10,114,655 | B2 | * | 10/2018 | Li | ........................ G06F 9/4406 |
| 10,353,790 | B1 | * | 7/2019 | Rangaiah | .............. G06F 11/263 |

(Continued)

FOREIGN PATENT DOCUMENTS

| | | | |
|---|---|---|---|
| JP | 2000-315157 A | | 11/2000 |
| JP | 2012234327 A | * | 11/2012 |
| JP | 2012234330 A | * | 11/2012 |

*Primary Examiner* — Matthew M Kim
*Assistant Examiner* — Indranil Chowdhury
(74) *Attorney, Agent, or Firm* — Canon U.S.A., Inc. IP Division

(57) ABSTRACT

An information processing apparatus includes a storage unit, a first starter unit that starts up a system program, a second starter unit that starts up an updating program for updating the system program, and a control unit that control to, in a case where the updating program has not been started up normally, start up a recovery program, and output a message prompting a user to attach a storage medium storing a snapshot image of the storage unit including the updating program for updating the system program.

10 Claims, 3 Drawing Sheets

(56) References Cited

U.S. PATENT DOCUMENTS

| | | | | |
|---|---|---|---|---|
| 10,394,570 B2* | 8/2019 | Baik | ............... | G06F 9/4406 |
| 2002/0092010 A1* | 7/2002 | Fiske | ............... | G06F 11/1433 |
| | | | | 717/168 |
| 2008/0109676 A1* | 5/2008 | Hama | ............... | G06F 11/1417 |
| | | | | 714/6.12 |
| 2010/0238507 A1* | 9/2010 | Matsushima | ............... | G03G 15/50 |
| | | | | 358/1.16 |
| 2013/0268924 A1* | 10/2013 | Niwa | ............... | G06F 8/654 |
| | | | | 717/168 |
| 2013/0290964 A1* | 10/2013 | Kodera | ............... | G06F 9/48 |
| | | | | 718/100 |
| 2014/0129820 A1* | 5/2014 | Lim | ............... | G06F 9/4401 |
| | | | | 713/2 |

* cited by examiner

START-UP PROCESSING FOR INFORMATION PROCESSING APPARATUS AND METHOD, AND STORAGE MEDIUM

BACKGROUND

Field

Embodiments of the disclosure relate to an information processing apparatus and method, and a non-transitory computer-readable storage medium storing a program.

Description of the Related Art

These days, in devices such as printers and computers, it is common to update a program from an external interface such as a network or a USB.

There is a risk of failure in updating the program if the power supply to the device is cut off during the updating of the program due to a power failure or the like.

To address this, it is known to back up a program before updating in advance, and, if not all of the program subjected to updating is stored in the device, "rolling back" to the backup of the program before updating is executed. Such a function is disclosed in, for example, Japanese Patent Laid-Open No. 2000-315157.

However, if a program for updating a program necessary for starting up a system is not launched normally, in the technique disclosed in Japanese Patent Laid-Open No. 2000-315157, recovery might fail due to repetition of rebooting in such a state.

SUMMARY

An information processing apparatus according to some aspects of the disclosure includes a storage unit, a first starter unit configured to start up a system program, a second starter unit configured to start up an updating program for updating the system program, and a control unit configured to, in a case where the updating program has not been started up normally, start up a recovery program, and output a message prompting a user to attach a storage medium storing a snapshot image of the storage unit including the updating program for updating the system program.

Further features will become apparent from the following description of exemplary embodiments with reference to the attached drawings.

DESCRIPTION OF THE EMBODIMENTS

With reference to the accompanying drawings, some exemplary embodiments of the present disclosure will now be explained.

First Embodiment

Figure 1:
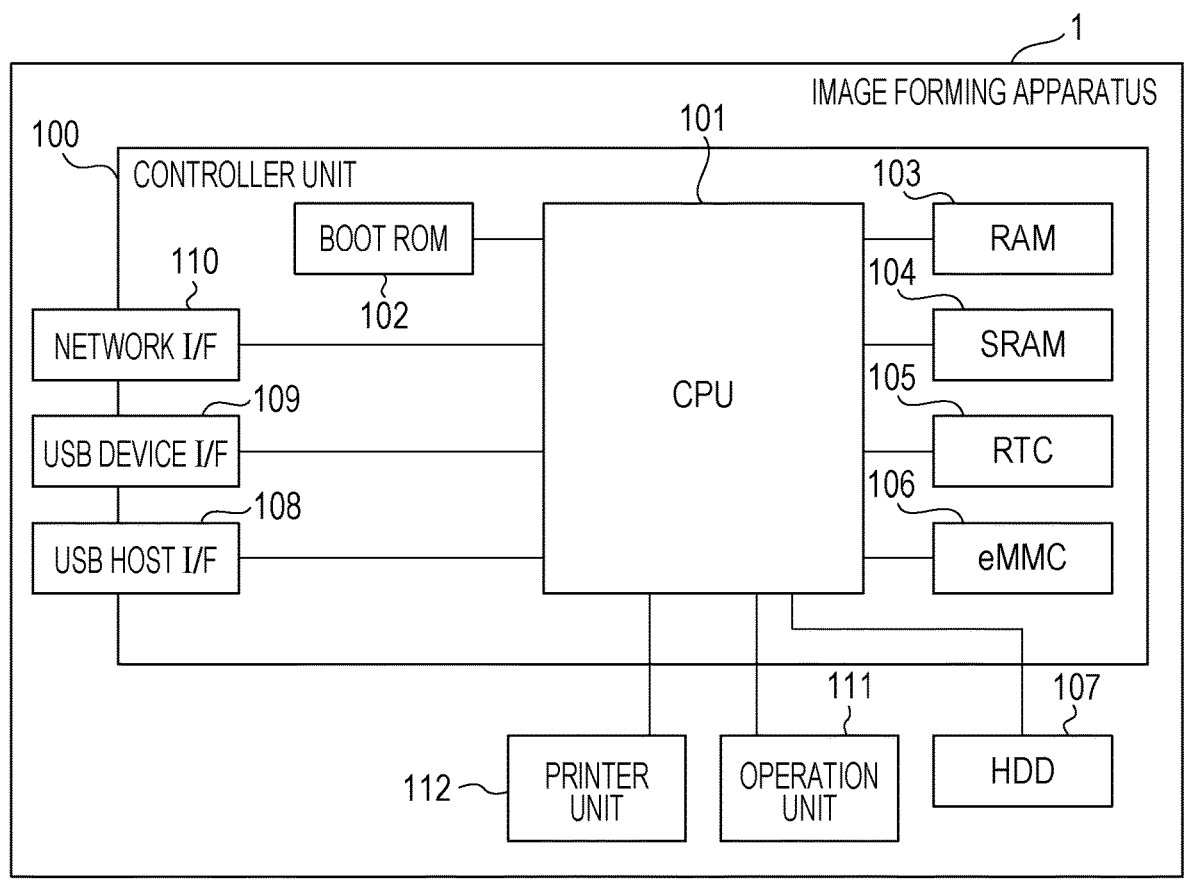
FIG. 1 is a block diagram that illustrates an example of hardware components of an image forming apparatus.

FIG. 1 is a block diagram that illustrates an example of hardware components of an image forming apparatus 1.

The image forming apparatus 1 includes a controller unit 100, an operation unit 111, and a printer unit 112 as its hardware components.

The controller unit 100 controls each device and unit. The operation unit 111 is used for operation of, and display on, the image forming apparatus 1. The printer unit 112 is a print engine for outputting a digital image on a medium such as paper.

The controller unit 100 is a so-called general-purpose CPU (Central Processing Unit) system. The controller unit 100 includes a CPU 101, a boot ROM 102, a RAM (Random Access Memory) 103, an SRAM 104, and an RTC (Real Time Clock) 105. The controller unit 100 further includes an eMMC (embedded Multi-Media Card) 106, an HDD (Hard Disk Drive) 107, a USB host I/F 108, a USB device I/F 109, and a network I/F 110. The eMMC 106 is an example of a storage unit.

The CPU 101 controls the entire operation of the image forming apparatus 1. The boot ROM 102 stores a boot program, and a program for recovery use (hereinafter referred to as "program for recovery"). The RAM 103 stores programs loaded from the boot ROM 102, the eMMC 106, etc. In addition, the RAM 103 serves as a temporary memory for data, etc. when the CPU 101 performs processing on the basis of the programs. The SRAM 104 stores and retains data such as setting information that is necessary for keeping the image forming apparatus 1 operable even when the power supply is cut off. The RTC 105 offers a clock function. The eMMC 106 stores programs and various kinds of data and is used as a main storage. The HDD 107 stores programs and various kinds of data and is used as a sub storage. The HDD 107 is attached in a removable manner. The USB host I/F 108 is an interface that is connectable to a USB device such as a USB memory or a USB card reader. The USB device I/F 109 is an interface that is connectable to an external device via a USB cable. The network I/F 110 is an interface that enables the controller unit 100 (or the image forming apparatus 1) to get connected to an external network via a wired LAN and/or a wireless LAN.

For simplicity, in FIG. 1, some hardware components are omitted.

For example, although the CPU 101 includes many CPU peripheral hardware elements such as a chip set, a bus bridge, and a clock generator, they are not illustrated.

The CPU 101 performs processing on the basis of programs stored in the boot ROM 102, the eMMC 106, etc., thereby realizing the functions of the image forming apparatus 1 and processes in the flowchart of FIG. 3, which will be described later.

Next, the operation of the controller unit 100 will now be explained. Image printing on a medium such as paper is taken as an example.

From an external device such as a PC or a USB memory, a user instructs the image forming apparatus 1 to perform image printing via the I/F. Receiving the user instructions, the CPU 101 performs DMA transfer to the RAM 103 for storing image data temporarily.

The CPU 101 checks whether or not the storing of a predetermined amount of image data, or the entirety thereof, into the RAM 103 has been completed. Upon confirming that it has been put into the RAM 103, the CPU 101 sends an image output command to the printer unit 112.

The CPU 101 teaches the location of the image data on the RAM 103 to the printer unit 112. The image data on the RAM 103 is transmitted to the printer unit 112 in accordance with a synchronization signal sent from the printer unit 112.

Then, the image data is printed out on a medium such as paper by the printer unit 112.

In a case where printing is performed for outputting a plurality of print copies, the CPU 101 stores the image data on the RAM 103 into the eMMC 106 or the HDD 107 so that, for the second and subsequent copies, image transmission to the printer unit 112 can be performed without any need for demanding it from the external device.

Figure 2:
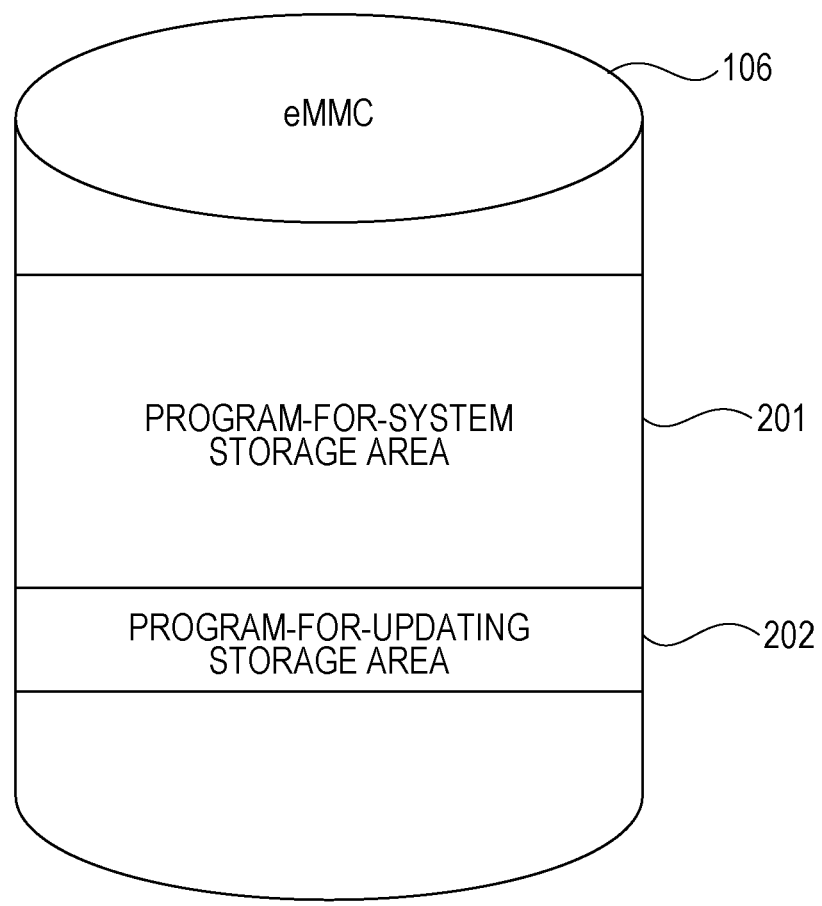
FIG. 2 is a diagram that illustrates an example of a partition structure of an eMMC.

FIG. 2 is a diagram that illustrates an example of a partition structure of the eMMC 106.

The eMMC 106 includes a program-for-system storage area 201, in which a program for system use (referred to as "program for system") for realizing normal operations of the image forming apparatus 1 is stored, and a program-for-updating storage area 202, in which a program for updating the "program for system" is stored. This updating program is referred to as "program for updating". The program-for-system storage area 201 is an example of a first storage area. The program-for-updating storage area 202 is an example of a second storage area.

Either the program for system or the program for updating is started up when the image forming apparatus 1 is started up.

For example, by operating the operation unit 111, a user selectively sets which one of these two programs is to be started up. Alternatively, triggered by the storing of a new version of the program for system in the HDD 107, the program for updating is automatically selected when the image forming apparatus 1 is started up next time. The program for system is an example of a system program. The program for updating is an example of an updating program.

Figure 3:
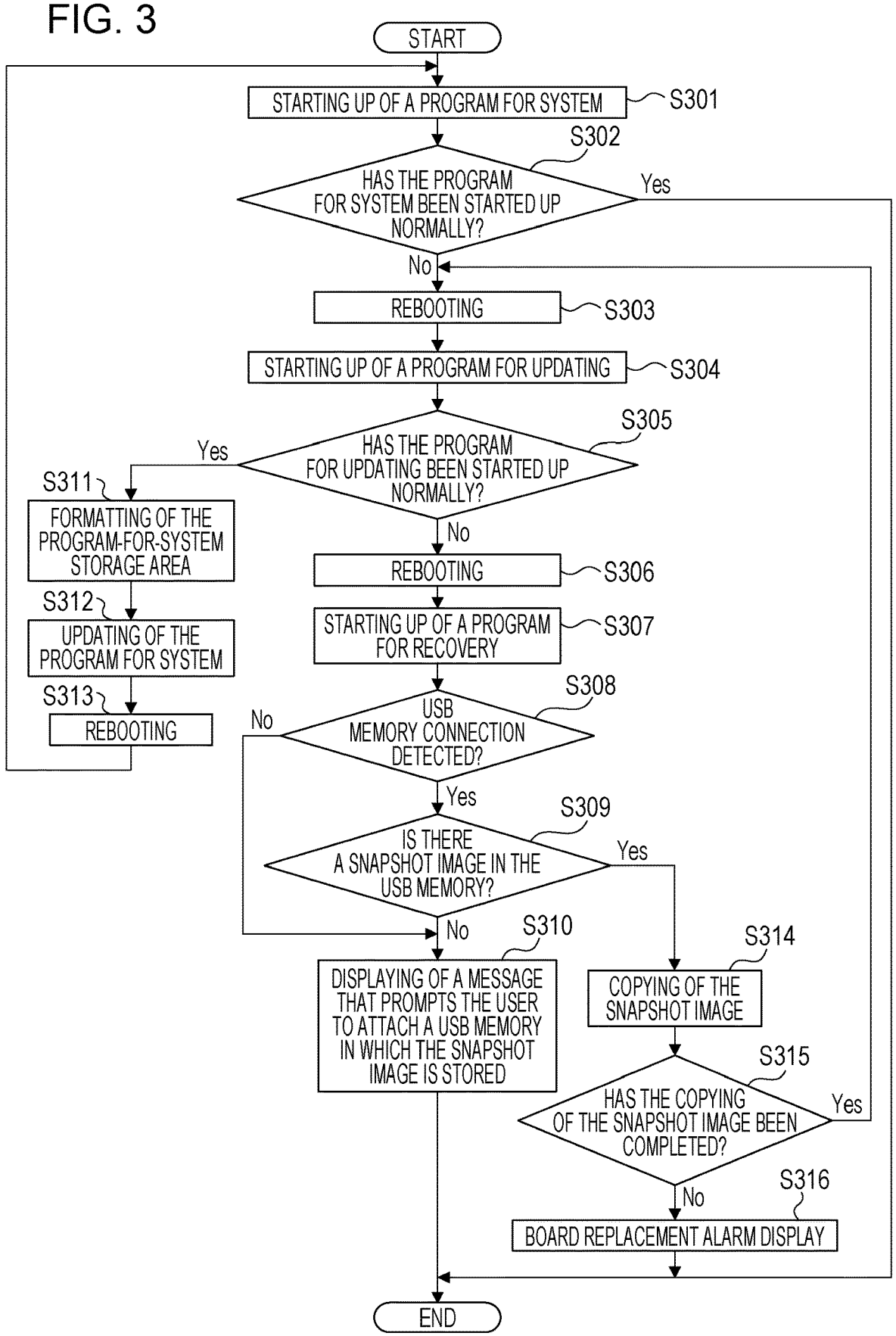
FIG. 3 is a flowchart that illustrates an example of information processing regarding a recovery method.

FIG. 3 is a flowchart that illustrates an example of information processing regarding a recovery method.

When the image forming apparatus 1 is powered on, in S301, the CPU 101 loads the program for system from the program-for-system storage area 201 of the eMMC 106 into the RAM 103, and runs the loaded program. The processing in S301 is an example of first start-up processing.

In S302, the CPU 101 determines whether the program for system has been started up normally or not. If it is determined by the CPU 101 that the program for system has not been started up normally, the flow proceeds to S303. The CPU 101 terminates processing in the flowchart of FIG. 3 if the program for system has been started up normally.

In S303, the CPU 101 reboots the image forming apparatus 1.

In S304, the CPU 101 loads the program for updating from the program-for-updating storage area 202 of the eMMC 106 into the RAM 103, and runs the loaded program. The processing in S304 is an example of second start-up processing.

In S305, the CPU 101 determines whether the program for updating has been started up normally or not. The CPU 101 advances the flow to S306 if the program for updating has not been started up normally. The flow proceeds to S311 if it is determined by the CPU 101 that the program for updating has been started up normally.

In S311, the CPU 101 performs the formatting of the program-for-system storage area 201.

In S312, the CPU 101 updates the program for system.

Then, in S313, the CPU 101 reboots the image forming apparatus 1.

On the other branch, in S306, the CPU 101 reboots the image forming apparatus 1.

In S307, the CPU 101 starts up the program for recovery, which is stored in the boot ROM 102. In this step, the CPU 101 runs said program stored in the boot ROM 102 on the boot ROM 102 without loading it into the RAM 103. The program for recovery is an example of a recovery program.

After starting up the program for recovery, in S308, the CPU 101 accesses the USB host I/F 108 to determine whether a USB memory is attached or not. If the CPU 101 detects a USB memory connected, the flow proceeds to S309. If no USB memory is connected, the flow proceeds to S310.

In S309, the CPU 101 determines whether there is a snapshot image of the program-for-updating storage area 202 in the USB memory or not. The snapshot image mentioned herein is a snapshot image of the entire program-for-updating storage area including the program for updating. The CPU 101 advances the flow to S314 if there is a snapshot image of the program-for-updating storage area 202 in the USB memory. The CPU 101 advances the flow to S310 if there is no snapshot image of the program-for-updating storage area 202 in the USB memory. The USB memory is an example of a storage medium in which a snapshot image is stored.

In S314, the CPU 101 copies the snapshot image into the program-for-updating storage area 202 of the eMMC 106. The processing in S314 is an example of processing of reproducing the snapshot image stored in the storage medium into the storage unit.

In S315, the CPU 101 determines whether the copying of the snapshot image has been completed or not. The CPU 101 returns the flow to S303 if the copying of the snapshot image has been completed. The CPU 101 advances the flow to S316 if the copying of the snapshot image does not finish.

In S316, since there is a possibility of a breakdown of the eMMC 106 in this case, the CPU 101 performs board replacement alarm display on the operation unit 111.

In S310, the CPU 101 displays, on the operation unit 111, a message that prompts the user to attach a USB memory in which the snapshot image is stored.

In the flow described above, the CPU 101 checks whether the program for system has been started up normally or not and checks whether the program for updating has been started up normally or not by performing logical determination, for example, by checking the checksum value of the program, by checking whether a run completion log is outputted or not when the program is run, or the like.

As an example of other methods for logical determination, the CPU 101 may use file system checking that is available in general OS.

Possible abnormality other than the above is that the operation unit 111 or the printer unit 112 is physically disconnected from the CPU 101.

In such a case, the CPU 101 displays, on the operation unit 111 for an alert, an error code for prompting the user to check the line connection, separately from the above-described determination as to whether the program has been started up normally or not. Therefore, it is not included in the program check of the present embodiment.

For this reason, if the apparatus is an SFP (Single Function Peripheral) that has a printer function only as in the present embodiment, the CPU 101 is able to determine that the starting up (launching) has been done normally as long as printer activation has been completed successfully. If the apparatus is an MFP (Multi Function Peripheral) that has a scanner function and a printer function, the CPU 101 is able to determine that the starting up has been done normally as long as scanner activation and printer activation have been completed successfully.

In the present embodiment, it is the CPU 101 that checks whether each program has been started up normally or not.

However, each of the program for system, the program for updating, and the program for recovery may include a self-check program for checking whether the starting up has been done normally or not.

The self-check program may perform such a start-up check independently of the corresponding program.

In the above description of the present embodiment, an image forming apparatus is taken as an example. However, the processing in the present embodiment can be applied not only to an image forming apparatus but also to various kinds of an information processing apparatus, for example, a portable terminal such as a PC (Personal Computer) or a smartphone, etc., a server, and the like.

In the present embodiment, a message that prompts a user to replace the controller board with another one is displayed because an eMMC is implemented mostly on an on-board mount basis. However, if the main storage is removable, a message that prompts a user to replace the main storage with another one may be displayed. Such a controller board and main storage is an example of a part that includes the storage unit.

Other Embodiments

The present disclosure may be embodied by supplying, to a system or an apparatus via a network or in the form of a storage medium, a program for realizing and implementing at least one of the functions of the embodiment described above, and by causing at least one processor in the computer of the apparatus or the system to read out and run the program. The present disclosure may be embodied by means of circuitry realizing and implementing at least one of the functions of the embodiment described above (for example, ASIC).

Although one example of exemplary embodiments of the present disclosure is explained above, the scope of the disclosure is not limited to such a specific example.

For example, the hardware components of the image forming apparatus 1 may include a plurality of CPUs, and the plurality of CPUs may perform processing on the basis of programs stored in the boot ROM 102, the eMMC 106, etc. A GPU (Graphics Processing Unit) may be used in place of a CPU in the hardware components of the image forming apparatus 1.

With the embodiments described above, even in a case where the program for updating the program for system fails to operate normally, it is possible to prevent repetitive rebooting and perform successful recovery.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-174314, filed Sep. 11, 2017, which is hereby incorporated by reference herein in its entirety.

What is claimed is:

1. An information processing apparatus, comprising:
    a storage that stores a system program and an updating program for updating the system program; and
    a controller, having a processor which executes instructions stored in a memory or having circuitry, being configured to:
        be able to perform first start-up processing of starting up the system program;
        be able to perform second start-up processing of starting up the updating program for updating the system program;
        cause, based on detecting a connection of an external storage in a state in which the first start-up processing is not performed normally and the second start-up processing is also not performed normally, the storage to store backup information that is stored in the external storage and includes the updating program for updating the system program, and start up the updating program of the backup information stored in the storage; and
        output, based on not detecting a connection of the external storage in a state in which the first start-up processing is not performed normally and the second start-up processing is also not performed normally, a message prompting a user to connect the external storage in which the backup information is stored.

2. The information processing apparatus according to claim 1, wherein the controller outputs a message prompting the user to replace a part that includes the storage unit with another part in a case where processing for causing the storage to store the backup information does not finish.

3. The information processing apparatus according to claim 2, wherein the controller displays the message prompting the user to replace the part that includes the storage with another part in a case where the processing for causing the storage to store the backup information does not finish.

4. The information processing apparatus according to claim 1,
    wherein the storage is an embedded Multi-Media Card,
    wherein the system program is stored in a first storage area of the embedded Multi-Media Card, and
    wherein the updating program is stored in a second storage area of the embedded Multi-Media Card.

5. The information processing apparatus according to claim 1, wherein the controller displays the message prompting the user to attach the external storage on an operation interface.

6. The information processing apparatus according to claim 1, wherein the information processing apparatus is an image forming apparatus.

7. The information processing apparatus according to claim 1, further comprising:
    a printer that prints image data on a sheet,
    wherein the controller determines that the first start-up processing is performed normally in a case where the printer is started up successfully and determines that the first start-up processing is not performed normally in a case where the printer is not started up successfully.

8. The information processing apparatus according to claim 1, further comprising:
    a scanner that scans a document to generate image data; and
    a printer that prints image data on a sheet,
    wherein the controller determines that the first start-up processing is performed normally in a case where the printer and the scanner are started up successfully and determines that the first start-up processing is not performed normally in a case where the printer and the scanner are not started up successfully.

9. An information processing method executed by an information processing apparatus including a storage that stores a system program and an updating program for updating the system program, the information processing method comprising:

performing first start-up processing of starting up the system program;

performing second start-up processing of starting up the updating program for updating the system program;

causing, based on detecting a connection of an external storage in a state in which the first start-up processing is not performed normally and the second start-up processing is also not performed normally, the storage to store backup information that is stored in the external storage and includes the updating program for updating the system program, and starting up the updating program of the backup information stored in the storage; and outputting, based on not detecting a connection of the external storage in a state in which the first start-up processing is not performed normally and the second start-up processing is also not performed normally, a message prompting a user to connect the external storage in which the backup information is stored.

10. A non-transitory computer-readable storage medium storing a program for causing a computer to execute a method for an information processing apparatus including a storage that stores a system program and an updating program for updating the system program, the method comprising:

performing first start-up processing of starting up the system program;

performing second start-up processing of starting up the updating program for updating the system program;

causing, based on detecting a connection of an external storage in a state in which the first start-up processing is not performed normally and the second start-up processing is also not performed normally, the storage to store backup information that is stored in the external storage and includes the updating program for updating the system program, and starting up the updating program of the backup information stored in the storage; and outputting, based on not detecting a connection of the external storage in a state in which the first start-up processing is not performed normally and the second start-up processing is also not performed normally, a message prompting a user to connect the external storage in which the backup information is stored.

* * * * *